(12) United States Patent
Swanson et al.

(10) Patent No.: US 8,732,947 B2
(45) Date of Patent: May 27, 2014

(54) METHOD FOR ACCESSING COMPONENTS OF A FAN CLUTCH SYSTEM

(75) Inventors: Craig M. Swanson, Perham, MN (US); Thomas M. Jagger, Golden Valley, MN (US)

(73) Assignee: Kit Masters Inc., Perham, MN (US)

( * ) Notice: Subject to any disclaimer, the term of this patent is extended or adjusted under 35 U.S.C. 154(b) by 460 days.

(21) Appl. No.: 13/035,749

(22) Filed: Feb. 25, 2011

(65) Prior Publication Data

US 2011/0207577 A1    Aug. 25, 2011

Related U.S. Application Data

(60) Provisional application No. 61/308,111, filed on Feb. 25, 2010.

(51) Int. Cl.
  *B23P 6/00* (2006.01)
  *B23P 19/04* (2006.01)
  *F16D 27/08* (2006.01)

(52) U.S. Cl.
  USPC ............ 29/889.1; 29/402.03; 29/402.04; 29/402.08; 29/426.1; 29/426.5; 29/469; 29/525.01; 29/592.1; 192/48.2

(58) Field of Classification Search
  USPC ............ 29/889.1, 889.5, 402.01, 402.03, 29/402.04, 402.08, 426.1, 426.5, 428, 469, 29/525.01, 592.1, 596; 192/48.2, 48.3, 192/84.2, 84.21, 84.31
  See application file for complete search history.

(56) References Cited

U.S. PATENT DOCUMENTS

| | | | |
|---|---|---|---|
| 4,926,992 A | | 5/1990 | Linnig |
| 5,330,040 A | * | 7/1994 | Drennen ................. 192/58.682 |
| 5,575,369 A | * | 11/1996 | Houters et al. ............... 192/58.7 |
| 5,994,810 A | * | 11/1999 | Davis et al. ................... 310/105 |
| 6,173,823 B1 | * | 1/2001 | Moser et al. ................. 192/21.5 |
| 6,699,130 B2 | * | 3/2004 | Wubbels ......................... 464/17 |
| 6,935,477 B2 | | 8/2005 | Inoue et al. |
| 7,143,885 B2 | | 12/2006 | Krafft |
| 7,311,189 B2 | * | 12/2007 | Swanson et al. ........... 192/85.23 |
| 7,497,310 B2 | | 3/2009 | Wolf |
| 7,520,373 B2 | | 4/2009 | Hill et al. |
| 7,540,365 B2 | | 6/2009 | Juergensmeyer et al. |
| 2004/0051413 A1 | | 3/2004 | Liran |
| 2004/0144611 A1 | | 7/2004 | Wolf et al. |
| 2005/0155834 A1 | | 7/2005 | Krafft |
| 2007/0023251 A1 | | 2/2007 | Juergensmeyer et al. |
| 2009/0242350 A1 | | 10/2009 | Juergensmeyer et al. |
| 2009/0321213 A1 | | 12/2009 | Geiger |
| 2010/0263981 A1 | | 10/2010 | Krafft et al. |

FOREIGN PATENT DOCUMENTS

| | | |
|---|---|---|
| DE | 102008049618 | 4/2010 |
| WO | 1999010972 | 3/1999 |

* cited by examiner

*Primary Examiner* — Sarang Afzali
(74) *Attorney, Agent, or Firm* — Oblon, Spivak, McClelland, Maier & Neustadt, L.L.P.

(57) ABSTRACT

Some embodiments of a fan clutch system for use in a vehicle can provide efficient access to one or more components for inspection and service even after the fan clutch system is installed in the vehicle. In particular embodiments, the fan clutch system can include a fan clutch device and a coil retainer assembly that are removably mounted to a right-angle gear box assembly in a manner that permits a technician to accessing at least one component for inspection, repair, or replacement. The coil retainer assembly may at least partially house an electromagnetic coil for selective activation. The system may further include a fan clutch device removably mounted to the drive member of the gear box assembly.

5 Claims, 6 Drawing Sheets

METHOD FOR ACCESSING COMPONENTS OF A FAN CLUTCH SYSTEM

CROSS-REFERENCE TO RELATED APPLICATIONS

This application claims the priority benefit of U.S. Provisional Application for Patent, Ser. No. 61/308,111, entitled "Fan Clutch System and Method," filed on Feb. 25, 2010, which is hereby incorporated by reference in its entirety for all purposes.

BACKGROUND

Vehicle transmission systems, cooling systems, and braking systems may employ clutches or like devices to selectively transmit rotational forces from a drive source to an output member. For example, some cooling systems employ fan clutch devices that control the output rotation of engine cooling fans. Such a fan clutch can be driven by a drive pulley that rotates in response to the vehicle engine.

In general, the clutch can be operated to engage (or disengage) opposing clutch surfaces, which rotationally interconnect (or rotationally disconnect) the drive pulley and the output member. In an example related to fan clutches, when the clutch surfaces shift to the engaged position, the output member (carrying fan blades) is driven to rotate along with the drive pulley. However, when the clutch surfaces are shifted to the disengaged position, the output member is no longer directly urged by the drive pulley.

SUMMARY

Some embodiments of a fan clutch system for use in a vehicle can provide efficient access to one or more components for inspection and service even after the fan clutch system is installed in the vehicle. In particular embodiments, the fan clutch system can include a fan clutch device and a coil retainer assembly that are removably mounted to a right-angle gear box assembly in a manner that permits a technician to accessing at least one component of the fan clutch device, the coil retainer assembly, or the right-angle gear box assembly for inspection, repair, or replacement. Moreover, in some cases, one or both of the fan clutch and the coil retainer assembly can be removed for inspection or service while the right-angle gear box assembly remains mounted in an engine compartment of a vehicle.

In some embodiments, a multi-speed fan clutch system can include a right-angle gear box assembly that transfers rotational motion from a drive pulley about a first axis to rotational motion of a drive shaft about a second axis that is generally transverse to the first axis. The system may also include a coil retainer assembly removably mounted to a housing component of the right-angle gear box assembly. The coil retainer assembly may at least partially house a first electromagnetic coil and a second electromagnetic coil. The first and second electromagnetic coils may be generally coaxial with one another and may be configured for separate activation. The system may further include a multi-speed fan clutch device mounted adjacent to the coil retainer assembly along a portion of the drive shaft extending from the right-angle gear box assembly.

In particular embodiments, a fan clutch system may include a gear box assembly that transfers rotational motion from an input member about a first axis to rotational motion of a drive member about a second axis that is transverse to the first axis. The system may also include a coil retainer assembly removably mounted to an outer casing component of the gear box assembly. The coil retainer assembly may at least partially house an electromagnetic coil for selective activation. The system may further include a fan clutch device removably mounted to the drive member of the gear box assembly. The fan clutch device may include a fan blade device that is urged to rotate in response to activation of the electromagnetic coil.

Some embodiments described herein may include a method of accessing one or more components of a fan clutch system. The method may include removing a fan clutch device from a portion of a drive shaft extending from a right-angle gear box assembly such that the fan clutch device is moved away from a coil retainer assembly housing at least one electromagnetic coil. The method may also include removing the coil retainer assembly from a mounting relationship with an outer casing of the right-angle gear box assembly while the right-angle gear box assembly remains in its assembled state. The method may also include accessing at least one component of the fan clutch device, the coil retainer assembly, or the right-angle gear box assembly for inspection, repair, or replacement.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION OF ILLUSTRATIVE EMBODIMENTS

Figure 1:
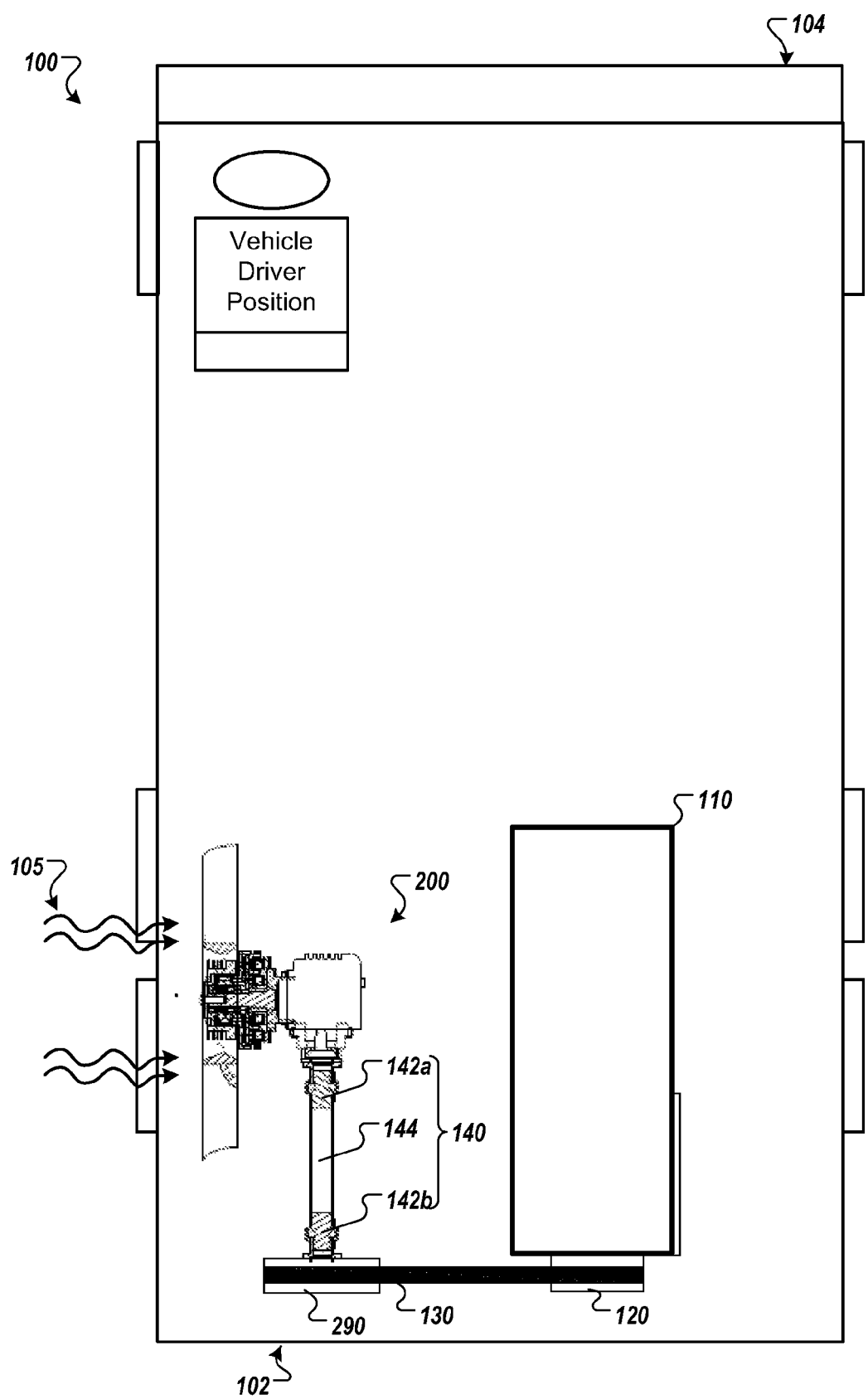
FIG. 1 shows a top view of an example vehicle that employs a right-angle fan clutch system.

Referring to FIG. 1 some embodiments of a vehicle 100 can employ a right-angle fan clutch system 200. Generally, the vehicle 100 may be a commercial vehicle such as a bus or large truck, a recreational vehicle such as a motor home, or other types of vehicles that may implement a fan clutch for use in an engine cooling system.

The vehicle 100 in this embodiment includes an engine 110 arranged at a rear portion 102 of the vehicle (opposite to a front portion 104). Rotatably coupled to an output shaft (not shown) of the engine 110 is a pulley 120. As the engine 110 operates, the output shaft rotates, driving the pulley 120 to rotate. A belt 130 runs over the pulley 120 to transfer the rotational motion of the pulley 120 via a crown spline assembly 140 to a drive pulley 290, which in turn drives rotation of particular components of the right-angle fan clutch system 200. As described in more detail below, the right-angle fan clutch system 200 can operate to provide three different output speeds for a fan blade device, and is constructed such that various subassemblies may be individually removed for service or replacement while other subassemblies can remain mounted in the vehicle 100 (e.g., portions of the right-angle fan clutch system 200 can be serviced without requiring the entire right-angle fan clutch system 200 to be removed from the vehicle 100 or otherwise replaced). The components and operation of the right-angle fan clutch system 200 are further discussed in connection with FIGS. 2-6.

In some implementations, the crown spline assembly 140 may adjust the relative position of the right-angle fan clutch system 200 with respect to the engine 110 of the vehicle 100. The crown spline assembly 140 includes a first and a second crown spline 142a, 142b each matably fit with an input receptacle 291 (as shown in relation to FIG. 2) of a right-angle gear box 210 (as shown in relation to FIG. 2) or the drive pulley 290, respectively. The crown spline assembly 140 further includes an extension rod 144 coupled at one end to the first crown spline 142a and at the other end to the second crown spline 142b. As such, the length of the extension rod 144 can determine the relative position of the right-angle fan clutch system 200 with respect to the engine 110. An installer may determine the optimum place along the engine 110 to receive cooling airflow 105 generated by the right-angle fan clutch system 200, and install the extension rod 144 of the appropriate length accordingly. For example, if the extension rod 144 of a first length leads to a majority of the cooling airflow 105 circulating toward the middle of the engine 110, and the installer determines a portion of the engine closer to the front portion 104 requires cooling, the installer may replace the extension rod 144 with a second extension rod (not shown) having a second and perhaps longer length. In some implementations, the crown spline assembly 140 urges the input receptacle 291 to rotate with the drive pulley 290. Possible materials for the crown spline assembly 140 include metal and plastic.

Figure 2:
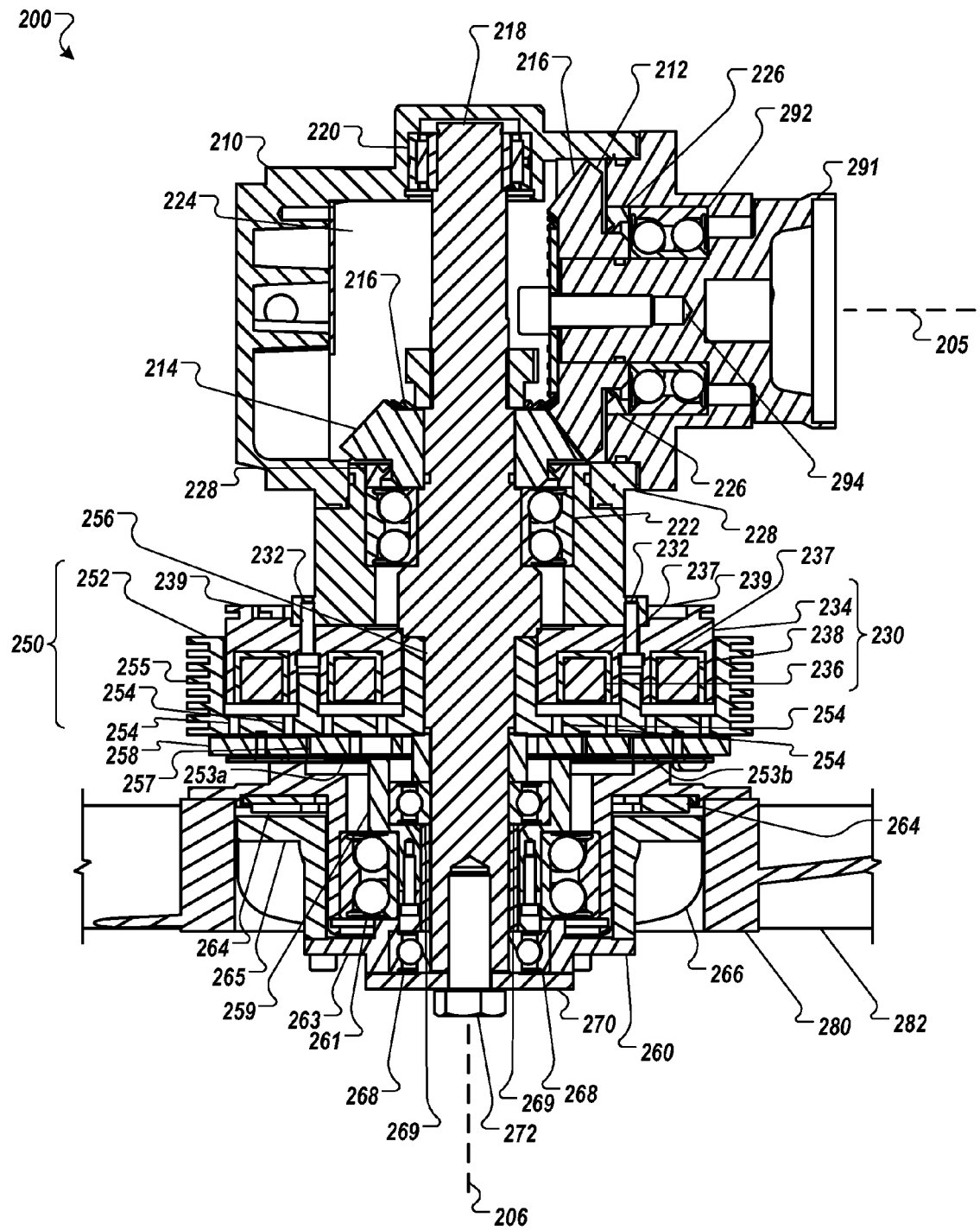
FIG. 2 shows a cross-sectional side view of the right-angle fan clutch system.

Referring to FIG. 2, some embodiments of the right-angle fan clutch system 200 can include the right-angle gear box 210 and an electromagnetic clutch device 250 that selectively rotates a fan blade device 280 in response to rotation of the drive pulley 290 (described in relation to FIG. 1). In this embodiment, the drive pulley 290 (FIG. 1) mounts to the crown spline assembly 140, and subsequently to the input receptacle 291 of the right-angle gear box 210. In other implementations, the drive pulley 290 may mount directly to the input receptacle 291 (e.g., when there is no need for extension to align the right-angle fan clutch system 200 for improved air flow). Both the drive pulley 290 (FIG. 1) and the input receptacle 291 (FIG. 2) may be driven to rotate about a first central axis 205 via the crown spline assembly 140 coupled to the belt 130 connection with the pulley 120 of the engine 110. Thus, the drive pulley 290 provides the input rotation for the right-angle gearbox 210 through the crown spline assembly 140 that translates the rotational motion about the first central axis 205 to a rotational motion about a second central axis 206. The translated rotational motion enables the electromagnetic clutch device 250 to selectively drive the fan blade device 280 at one of three different speeds (described in more detail below). As such, the right-angle fan clutch system 200 may be assembled into a vehicle, such as near the front of a semi-truck or near the rear of a passenger bus, to provide cooling airflow 105 in a direction that is generally transverse to the output shaft (not shown) and the pulley 120 of the engine 110.

The drive pulley 290, the crown spline assembly 140, and the input receptacle 291 rotate together about the first central axis 205, in some implementations, due to a bearing 292 housed within the right-angle gear box 210. The input receptacle 291 can be secured to an input bevel gear 212 by a bolt 294. The input bevel gear 212, as illustrated, mates with an output bevel gear 214 at a substantially perpendicular angle. In the illustrated example, the bevel gears 212-214 are formed with a collection of straight-cut gear teeth 216 wherein the teeth are oriented substantially in line with the gear's axis of rotation. In other embodiments the gear teeth 216 may be spiral-cut, wherein the gear teeth 216 may at least partly wrap around the gear's axis of rotation, or may be zero-cut wherein the gear teeth 216 may be curved but not angled. In the embodiment depicted in FIG. 2, the straight (non-spiral) gear teeth may be selected due to improved manufacturing efficiencies.

The output bevel gear 214 can be mounted to a central shaft 218 by a set of splines (not shown). The central shaft 218 can be driven by the output bevel gear 214 to rotate about the second central axis 206 (which is generally orthogonal to the first central axis 205). The central shaft 218 rotates about the second central axis 206 due in part to bearings 220 and 222. The housing components of the right-angle gear box 210 generally define a sealed lubricant fluid reservoir 224 that may be filled with a fluid such as oil or transmission fluid to provide lubrication at the interface between the bevel gears 212-214. The housing components of the right-angle gear box 210 can be mounted together via a set of mounting bolts (not shown in the cross-sectional view in FIG. 2). Bearing seal members 226 and 228 can carry seal rings that are compressed to seal the lubricant fluid reservoir 224. As such, in some implementations, the bearings 222 and 292 are serviceable (e.g., accessed and possibly serviced) without requiring the lubricant in the lubricant fluid reservoir 224 to be drained first. Such a feature can greatly reduce the time and cost associated with repairing or replacing the bearings 222 or 292 after the right-angle fan clutch system 200 is mounted and used in the vehicle 100.

A coil retainer 230 is removably coupled to a housing component of the right angle gearbox 210, for example by bolts 232. The coil retainer 230 includes a coil housing 234, an inner electromagnetic coil 236, and an outer electromagnetic coil 238. A collection of cooling fins 239, 255 are formed along a rear face and a circumferential surface of the coil housing 234, respectively, to dissipate heat that may be generated when one of the inner and outer electromagnetic coils 236, 238 is energized. As shown in FIG. 2, the inner and outer electromagnetic coils 236, 238 can be secured in the coil housing 234 by an adhesive material 237 including, for example, an epoxy configured to withstand high-temperature environments. In this embodiment, the selected epoxy material can be configured to substantially maintain its bonding properties in high-temperature environments of greater than 200 deg-C, greater than 300 deg-C, and preferably in the range of about 300 deg-C to about 600 deg-C (e.g., composition DP270 or DP190 supplied by 3M Company of Saint Paul, Minn.). Accordingly, the inner and outer electromagnetic coils 236 and 238 are firmly retained in the coil housing 234 even during engine operation at elevated temperatures, thereby reducing the likelihood of clutch failure to loosened or broken electromagnetic coils.

Still referring to FIG. 2, an input member 252 is mounted to the central shaft 218, for example by a set of splines 256, such that the input member 252 will always rotate with the central shaft 218 (rotate about the second central axis 206). The input member 252 in this embodiment can include a ferrous material (such as steel), and it can also include a set of slots 254 positioned adjacent to the inner and outer electromagnetic coils 236, 238 such that the input member 252 is configured to channel magnetic flux therethrough when any of inner and outer electromagnetic coils 236-238 are activated. By selectively energizing one of the inner and outer electromagnetic coils 236, 238, the input member 252 can be used to urge the rotation of an output member 260 using an eddy current drive system or a friction drive system, as described in more detail below.

The inner electromagnetic coil 236 can be used to activate the eddy current drive system that urges the output member 260 to rotate at a speed different from that of the central shaft 218 and the input member 252 (e.g., at a slower slip speed different from the input drive speed). In this embodiment, the eddy current drive system includes an eddy current ring 265 that is arranged in a closely spaced relation to one or more permanent magnets 264 which can be mounted to the output member 260. In some implementations, a first friction ring 257 can be biased to be spaced apart from the input member 252 by a spring member (e.g., in this embodiment, a first spring plate 253a formed of spring steel) that is mounted to both the first friction ring 257 and a spacer 259. When the inner electromagnetic coil 236 is activated, the first friction ring 257 is urged by magnetic force to axially move into frictional contact with the input member 252 so that the frictional engagement causes the first friction ring 257 to rotate with the input member 252. The eddy current ring 265 is driven to rotate with the first friction ring 257 due to the mechanical connection via a spacer 259 and a plate 263. Thus, the eddy current ring 265 will rotate with the input member 252 whenever the inner electromagnetic coil 236 is activated. Due to a small air gap between the eddy current ring 265 and the permanent magnets 264, the eddy current ring 265 will rotate relative to the permanent magnets 264 so that eddy currents are generated in the eddy current ring 265. As such, the permanent magnets 264 (and the output member 260 mounted thereto) will be forced to rotate at a slip speed that is less than the input drive speed of the eddy current ring 265, the first friction ring 257, and the input member 252 (when the inner electromagnetic coil 236 is activated).

In some embodiments, a set of cooling fins 266 may be formed on the eddy current ring 265 in such an arrangement to dissipate of heat generated in the eddy current ring 265 due to the eddy currents. As shown in FIG. 2, the cooling fins 266 can extend from a forward axial face of the eddy current ring 265 to provide increased exposure to ambient air for improved heat dissipation.

Still referring to FIG. 2, the outer electromagnetic coil 238 can be used to activate the friction drive system that urges the output member 260 to rotate at a speed substantially the same as that of the central shaft 218 and the input member 252. In this embodiment, a second friction ring 258 can be biased to be spaced apart from the input member 252 by a second spring member (e.g., in this embodiment, a second spring plate 253b formed of spring steel) that is mounted to both the second friction ring 258 and the output member 260. When the outer electromagnetic coil 238 is activated, the second friction ring 258 is urged to move by magnetic force into frictional contact with the input member 252 so that the frictional engagement causes the second friction ring 258 to rotate with the input member 252. Due to the mechanical connection therebetween, the second friction ring 258 urges the output member 260 to rotate at substantially the same speed as the input member 252 and the central shaft 218. As such, the output member 260 (and the fan blade device 280 mounted thereto) will be forced to rotate at a speed that is substantially the same as the input drive speed of the input member 252 (when the outer electromagnetic coil 238 is activated).

The output member 260 can be substantially rotationally separated from the central shaft 218 by a bearing 261, a bearing 268 and a bearing 269. In some implementations, the output member 260 may rotate at a third speed different from that of the eddy current drive system or the friction drive system when both the inner and outer electromagnetic coils 236, 238 are deenergized. For example, when neither the inner electromagnetic coil 236 nor the outer electromagnetic coil 238 is activated, the output member 260 may operate at a zero speed (i.e., a near zero-speed in some circumstances due to any inherent friction of the bearings 261, 268, 269).

The fan blade device 280 is coupled to the output member 260 such that when the output member 260 is urged to rotate, so too is the fan blade device 280. The output member 260 can be rotatably secured in place by a cap 270. The cap 270 can be secured to the central shaft 218 by a bolt 272. The fan blade device 280 can include a number of fan blade structures 282 that are arranged to generate air flow, for example, as part of a vehicle's engine cooling system. The fan blade structures 282 can be angled, tapered, curved, or otherwise configured to direct the output of cooling airflow 105 (as shown in FIG. 1). In some embodiments, the output member 260 of the right-angle fan clutch system 200 may be configured to receive an output instrument other than the fan blade device 280. For example, the output member 260 may be configured to connect with other components that are to be selectively rotated, such as output shafts, gears, brake systems, and the like.

Such a multi-speed clutch system can be effective to provide different levels of airflow output from the fan blade device 280. For example, some vehicles may operate with extended periods of idle, such as semi-trucks, buses, vocational equipment (e.g., garbage trucks), or construction equipment vehicles, so the cooling system may periodically activate the friction drive system of the right-angle fan clutch system 200 to start rotation of fan blade device 280 to cool the engine. The high-speed rotation of the fan blades in these vehicles might be noticeably loud to both passengers (inside the vehicle cabin) and pedestrians (outside the vehicle cabin), especially when the vehicle is running at idle. However, the right-angle fan clutch system 200 described herein can be implemented within the vehicle cooling systems so that the fan blades are rotated at a second speed when the cooling system activates the right-angle fan clutch system 200 to engage the eddy current drive system rather than the friction drive system. The second speed of the fan blade device 280 may be less than the first speed, and thus the noise from the fan blade device 280 may be reduced.

Figure 3:
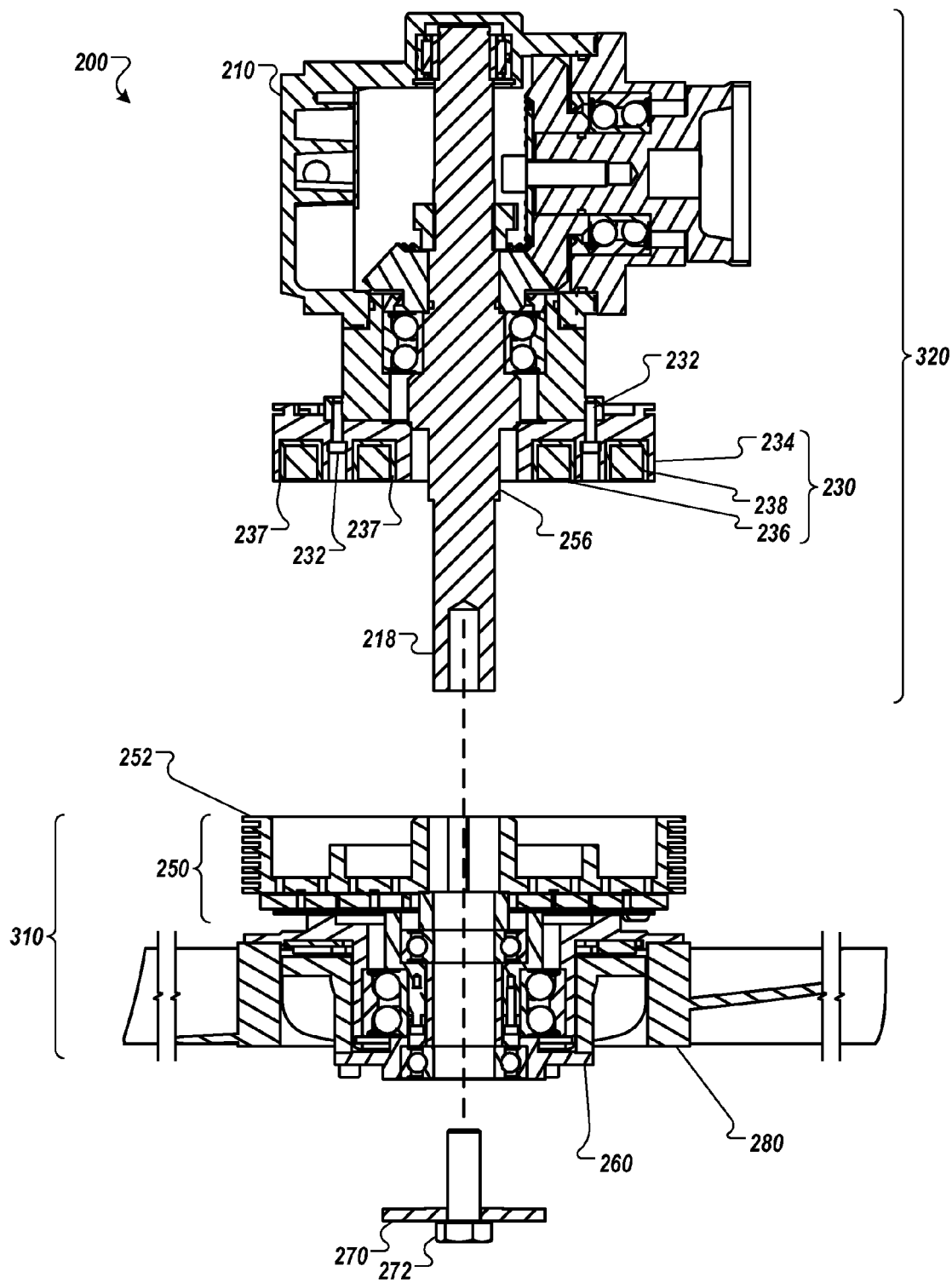
FIG. 3 shows a partly exploded cross-sectional side view of the right-angle fan clutch system.

Referring to FIG. 3, in some implementations, the electromagnetic clutch device 250 may be separated from the other components of the right-angle fan clutch system 200 while those other components of the right-angle fan clutch system 200 remain assembled together, for example, in the vehicle 100 or at a repair station. As such, the time and cost of servicing and repairing the right-angle fan clutch system 200 may be reduced. For example, a service technician may avoid the time required to remove the entire right-angle fan clutch system 200 to repair or replace friction components of the electromagnetic clutch device 250 because the electromagnetic clutch device 250 can be readily separated from the other portions of the right-angle fan clutch system 200. In another example, maintenance costs may be reduced by substantially separating and replacing subcomponents of the right-angle fan clutch system 200 rather than removing and replacing the entire unit. In illustration, a used or depleted subassembly 310 may be removed and replaced by a new subassembly 310 without replacing the entire right-angle fan clutch system 200, thereby avoiding the expense of replacing the entire right-angle fan clutch system 200 (especially when the remaining subassembly 320 of the right-angle fan clutch system 200 is operable and does not require replacement).

In the illustrated example, the subassembly 310 that includes the input member 252, the output member 260, the fan blade device 280, and their respective subcomponents, is separated from a subassembly 320 that includes the coil retainer 230, the right angle gearbox 210, the central shaft 218, and their respective subcomponents. In some embodiments, the subassembly 310 may be removed from the right-angle fan clutch system 200 by unthreading the bolt 272 from the central shaft 218. Once the bolt 272 is removed, the cap 270 can be removed, allowing the subassembly 310 to slide axially along the central shaft 218 until it is freed.

Once the subassembly 310 removed, service personnel also have ready access to the coil retainer 230. For example, by removing the subassembly 310 the coil housing 234 and the inner and outer electromagnetic coils 236, 238 are all exposed for inspection and possible service. Optionally, this process can occur even while the right-angle gear box 210 remains assembled in the vehicle 100. If the coil housing 234, the inner and outer electromagnetic coils 236 and 238, and the adhesive material 237 remain is satisfactory condition after an inspection, the subassembly 310 (new or repaired) can be reassembled to the subassembly 320. Reassembly of the subassemblies 310-320 may include sliding the subassembly 310 axially over the central shaft 218 such that the input member 252 engages the splines 256, inserting the bolt 272 through the cap 270, and threading the bolt 272 into the central shaft 218.

Figure 4:
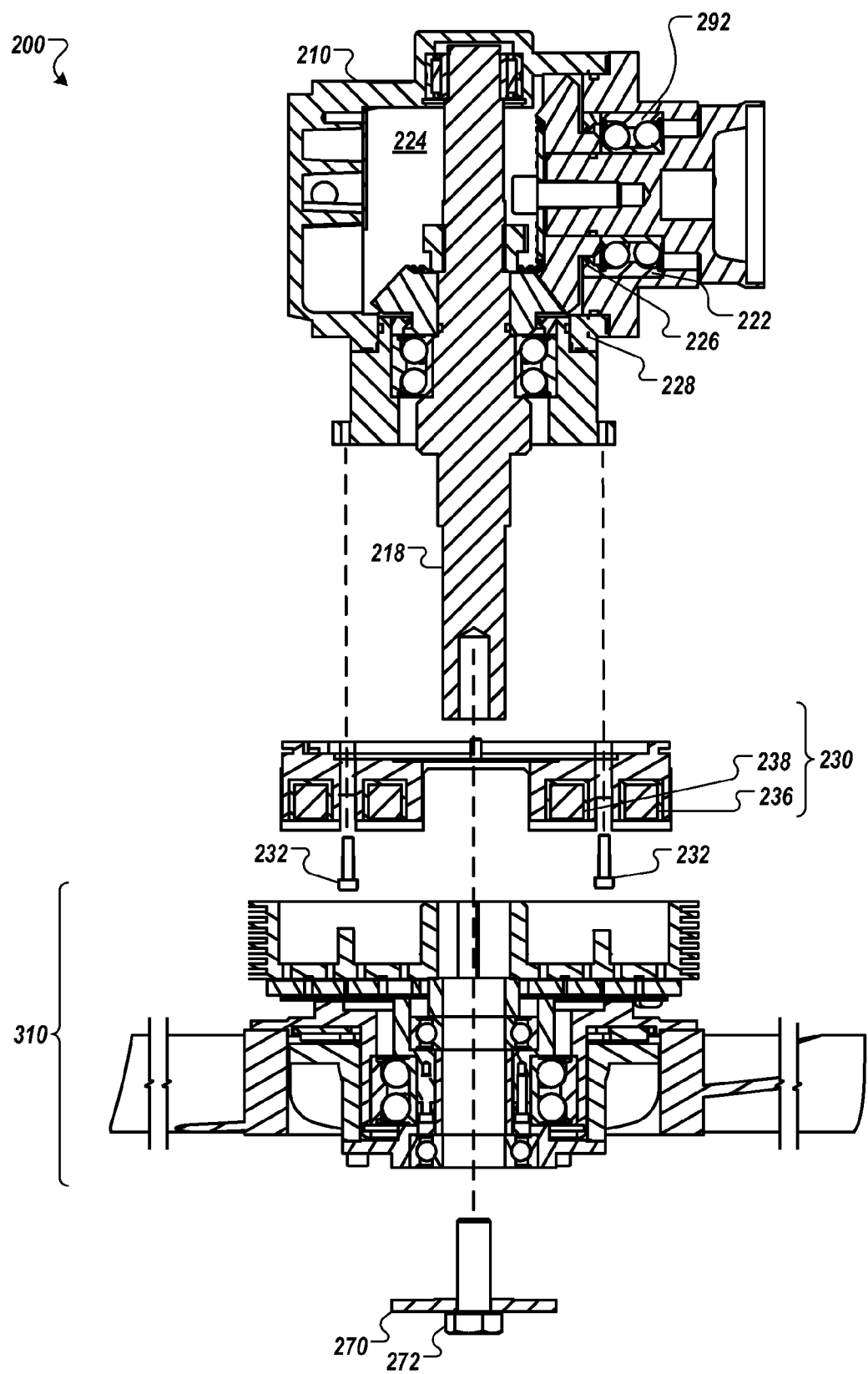
FIG. 4 shows another partly exploded cross-sectional side view of the right-angle fan clutch system.

Referring now to FIG. 4, in some circumstances, one or more components of the coil retainer 230 may require repair or replacement. As such, the coil retainer 230 can be readily removed while the right-angle gear box 210 remains mounted to the vehicle 100. Alternatively, one or more components of the right-angle gear box 210 may require service (e.g., repair or replacement of the bearing 222). The coil retainer 230 can be readily removed to provide access to the one or more components of the right-angle gear box 210 (which may remain in the vehicle 100 or may be removed for repair at a service station).

As shown in FIG. 4, the right-angle fan clutch system 200 can optionally be further disassembled beyond the embodiment illustrated by FIG. 3. Similar to what is depicted in FIG. 3, the subassembly 310 is freed by loosening the bolt 272 from the central shaft 218 and removing the cap 270. Once the cap 270 is removed, the subassembly 310 may be removed by axially sliding the subassembly 310 along the central shaft 218 until is it freed. Referring back to FIG. 3, once the subassembly 310 is separated, access may be gained to the bolts 232. The bolts 232 may be removed to decouple the coil retainer 230 from the right-angle gearbox 210, while leaving the right angle gearbox 210 in its assembled form. In some implementations, by providing the coil retainer 230 as a subassembly that is separable from the outer housing component of right-angle gearbox 210, a technician can perform repairs, replacements, inspections, and other types of service operations in a more efficient manner. For example, by providing the coil retainer 230 as a subassembly that is separable from the right-angle gearbox 210, the coil retainer 230 may be repaired or replaced without incurring the time or expense of removing or replacing the entire right-angle fan clutch system 200. In another example, the right-angle gearbox 210 may be removed from the vehicle 100 for service, and replaced with a substantially similar right-angle gearbox 210 while retaining the existing coil retainer 230, the electromagnetic clutch device 250, and the fan blade device 280, thereby at least partly avoiding the expense of replacing subcomponents that may have not yet exceeded their service lifetimes.

As shown in FIG. 4, when the coil retainer 230 is removed from the right-angle gear box 210, a technician can readily access a number of replaceable components of the right-angle gear box 210. For example, after the coil retainer 230 is detached from the outer housing component of the right-angle gear box 210, the service technician can readily access and inspect one or both of the bearings 222 and 292 of the right-angle gearbox 210. Further, as shown in FIG. 4, the coil retainer 230 is removably mountable to the outer housing component of the right-angle gearbox 210 such that the bearing seal members 226 and 228 remain intact during the disassembly of the coil retainer 230. As such, in some implementations, the inner and outer electromagnetic coils 236 and 238 or the entire coil retainer 230 is removable and serviceable without requiring the lubricant in the lubricant fluid reservoir 224 of the right-angle gearbox 210 to be drained. Such a feature can greatly reduce the time and cost associated with repairing or replacing one or more components of the coil retainer 230 after the right-angle fan clutch system 200 is mounted and used in the vehicle 100.

Reassembly of the right-angle fan clutch system 200 as depicted in FIG. 4 is substantially the opposite of the disassembly process. The coil section 230 is slid axially over the central shaft 218 until it contacts the right angle gearbox 210. The bolts 232 are inserted though the coil section 230 and threaded into the right angle gearbox 210, thereby coupling the coil section 230 to the right angle gearbox 210. The subassembly 310 may then be slid axially along the central shaft 218 until it contacts the coil section 230. The bolt 272 may be inserted through the cap 270, and then threaded into the central shaft 218 to axially secure the subassembly 310.

Figure 5:
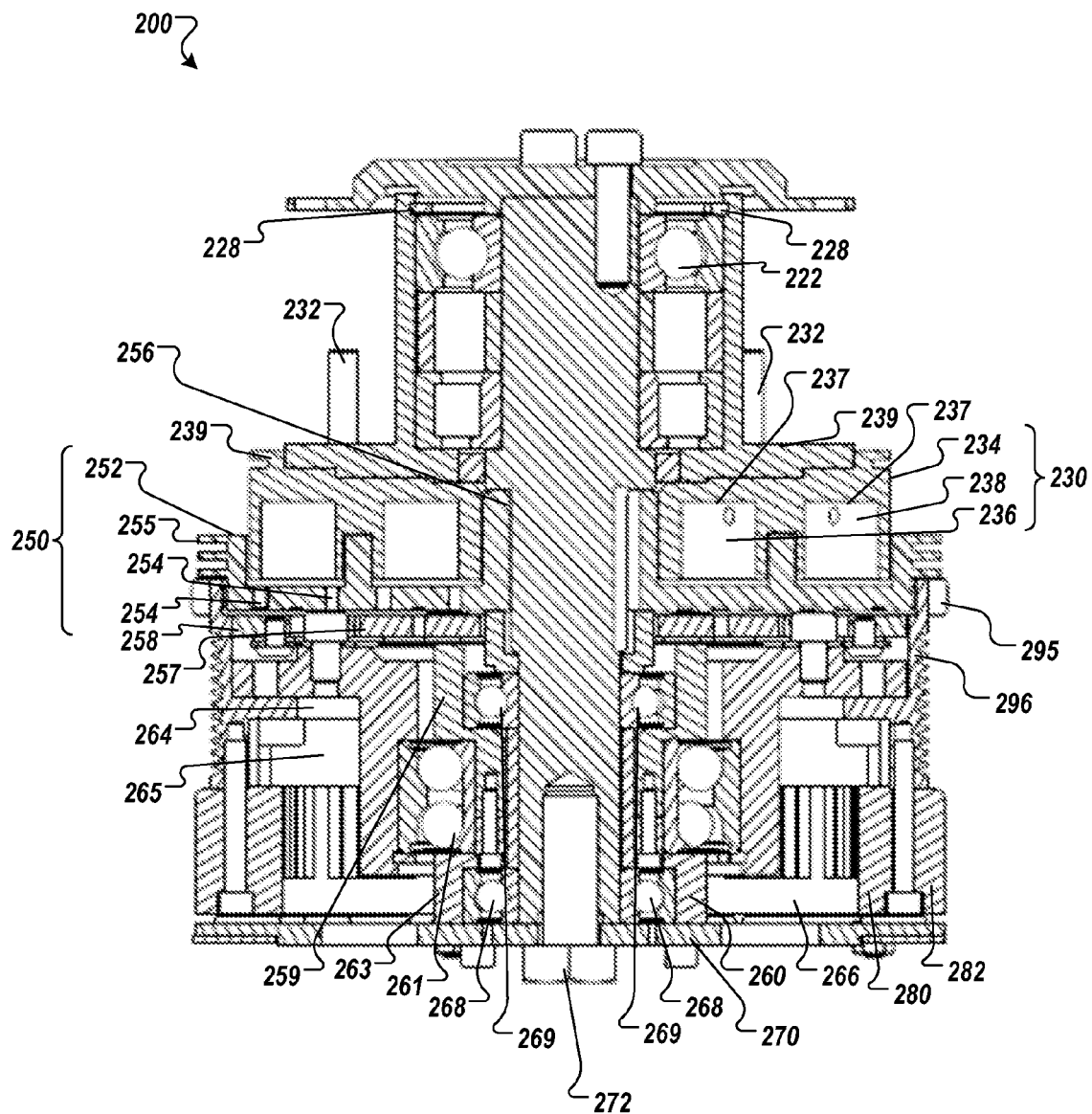
FIG. 5 shows another cross-sectional side view of the right-angle fan clutch system.
Figure 6B:
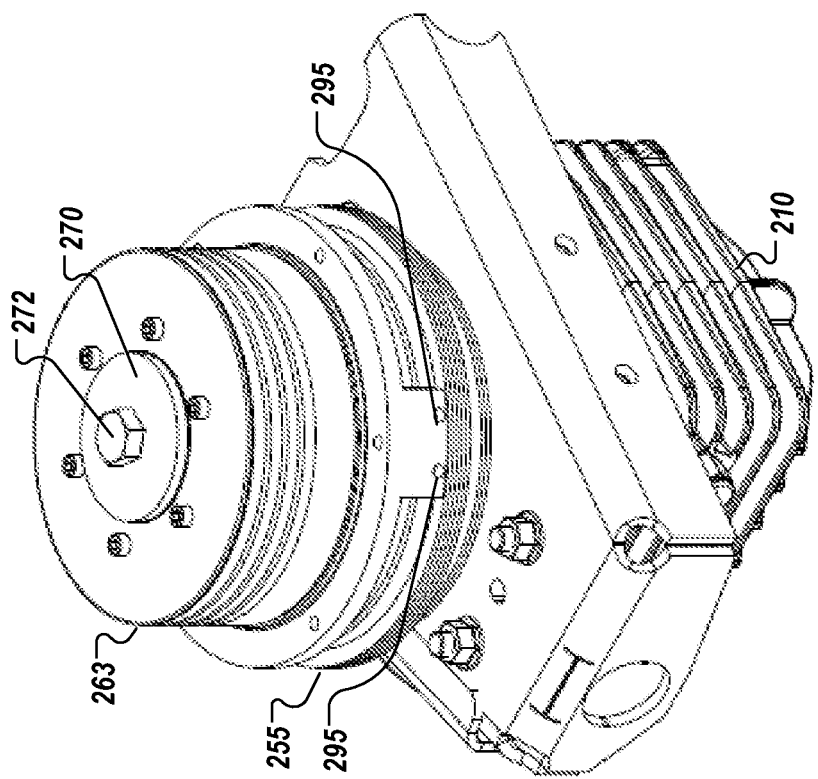
FIGS. 6A-B show a side view and a perspective view of the right-angle fan clutch system with the coming-home fail safe system.
Figure 6A:
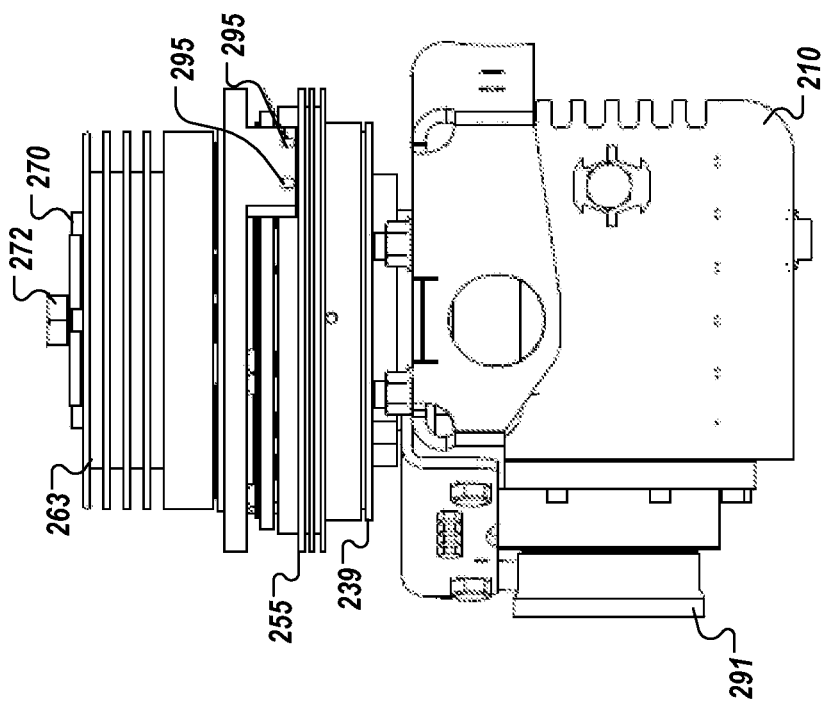

FIG. 5 shows a cross section view of an embodiment of the right-angle fan clutch system 200 with an added fail-safe feature. FIGS. 6A and 6B illustrate a side view and a perspective view of an embodiment of the right-angle fan clutch system 200 with the added fail-safe feature that allows the fan to continue to provide cooling to the engine 110 during certain malfunctions. In some circumstances, the right-angle fan clutch system 200 may experience malfunctions or failures in which the fan blade device 280 remains at substantially the zero speed (i.e., a near zero-speed in some circumstances due to any inherent friction of the bearings 261, 268, 269). Such malfunctions or failures can be caused by the inability for the inner and outer electromagnetic coils 236, 238 to bias the first and second friction rings 257, 258 against the input member 252, for example. Accordingly, the right-angle fan clutch system 200 can no longer provide proper cooling to the engine 110 (as shown in FIG. 1), which may lead to an unsafe increase in the temperature in the engine compartment. This described increase in temperature can potentially cause a fire or other costly damages to the vehicle 100. In the implementation shown in FIGS. 5 and 6A-B, the right-angle fan clutch system 200 includes two or more coming-home screw holes 295 configured to receive two or more threaded screws (not shown) matably fit with the coming-home screw holes 295. A mounting frame 296 is fixedly coupled to the output member 260 of the right-angle fan clutch system 200. During a malfunction or failure of the right-angle fan clutch system 200, the output member 260 may rotate (at zero speed) relative to the input member 252 (rotating at full speed). If the operator of the vehicle 100 notices the malfunction or the failure, he can optionally insert the threaded screws through the coming-home screw holes 295 and the corresponding holes (not shown) in the mounting frame 296, into the corresponding holes (not shown) in the input member 252. The insertion of the threaded screws discourages the relative rotation between the input and output members 252, 260 and urges the output member 260 to rotate at the full speed with the input member 252. With the insertion of the threaded screws into the coming-home screw holes, the right-angle fan clutch system 200 can continue to provide cooling to the engine 110 of the vehicle 100 until the operator can reach a mechanical shop to complete the necessary repair. Upon the successful repair of the right-angle fan clutch system 200, the threaded screws can be extracted from the coming-home screw holes to resume the normal operation of the right-angle fan clutch system 200. When the right-angle fan clutch system 200 operates according to design, the two or more threaded screws may be mounted on the right-angle fan clutch system 200 for storage.

A number of implementations have been described. Nevertheless, it will be understood that various modifications may be made without departing from the spirit and scope. Accordingly, other implementations are within the scope of the following claims.

What is claimed is:

1. A method of accessing one or more components of a fan clutch system, comprising:
    removing a fan clutch device from a portion of a drive shaft extending from a right-angle gear box assembly such that the fan clutch device is moved away from a coil retainer assembly housing at least one electromagnetic coil;
    removing the coil retainer assembly from a mounting relationship with an outer casing of the right-angle gear box assembly while the right-angle gear box assembly remains in an assembled state mounted in a vehicle; and
    accessing at least one component of the fan clutch device, the coil retainer assembly, or the right-angle gear box assembly for inspection, repair, or replacement,
    wherein the right-angle gear box assembly includes an input receptacle having an axis which is substantially perpendicular to an axis of the drive shaft, an input gear coupled to the input receptacle, and an output gear coupled to the drive shaft,
    wherein the coil retainer assembly includes a coil housing, an inner electromagnetic coil, and an outer electromagnetic coil, the inner and outer electromagnetic coils being retained in the coil housing, and the coil housing including at least one hole through which a bolt passes for providing the mounting relationship between the coil retainer assembly and the outer casing of the right-angle gear box assembly, and
    wherein the fan clutch device includes an input member mounted on the portion of the drive shaft, and includes a set of slots positioned adjacent to the inner and outer electromagnetic coils.

2. The method of claim 1, wherein the step of removing the coil retainer assembly comprises removing the coil retainer assembly away from the right-angle gear box while a lubricant fluid reservoir of the right-angle gear box assembly remains sealed.

3. The method of claim 1, further comprising mounting the coil retainer assembly to the outer casing of the right-angle gear box assembly, and mounting the fan clutch device to the portion of the drive shaft extending from the right-angle gear box assembly after the at least one component of the fan clutch device, the coil retainer assembly, or the right-angle gear box assembly is inspected, repaired, or replaced.

4. The method of claim 1, wherein the step of removing the fan clutch device includes removing the fan clutch device while the right-angle gear box assembly remains mounted in an engine compartment of the vehicle.

5. The method of claim 1, wherein the step of removing the coil retainer assembly includes removing the coil retainer assembly while the right-angle gear box assembly remains mounted in an engine compartment of the vehicle.

* * * * *